(12) United States Patent
Vavelidis et al.

(10) Patent No.: US 8,081,941 B2
(45) Date of Patent: *Dec. 20, 2011

(54) METHOD AND SYSTEM FOR RF FRONT-END CALIBRATION SCHEME USING FRACTIONAL-N FREQUENCY SYNTHESIZED SIGNALS AND RSSI

(75) Inventors: Konstantinos Vavelidis, Ilioupolis (GR); Charalampos Kapnistis, Pefki (GR); Iason Vassiliou, Athens (GR)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,974

(22) Filed: Feb. 22, 2010

(65) Prior Publication Data

US 2010/0167673 A1 Jul. 1, 2010

Related U.S. Application Data

(63) Continuation of application No. 11/432,450, filed on May 11, 2006, now Pat. No. 7,668,521.

(51) Int. Cl.
*H04B 1/16* (2006.01)
(52) U.S. Cl. .................................................. 455/193.1
(58) Field of Classification Search ............... 455/182.1, 455/183.1, 192.1, 192.3, 226.1, 232.1, 234.1, 455/234.2, 245.1, 245.2, 302, 307, 313–318, 455/193.1
See application file for complete search history.

(56) References Cited

U.S. PATENT DOCUMENTS

| 5,907,798 | A | 5/1999 | Abramsky et al. |
| 6,978,125 | B2 | 12/2005 | Lindell et al. |
| 2006/0068740 | A1 | 3/2006 | Yokoyama |

OTHER PUBLICATIONS

Takeuchi et al. "asingle chip RF front end for the digital sound broadcasting" by SONY Corporation. Jun. 25, 2001.
Patrick Antonine, et al., "A Direct-Conversion Receiver for DVB-H", IEEE Journal of Solid-State Circuits, vol. 40, No. 12, Dec. 2005, pp. 2536-2546.
Mark Dawkins, Alison Payne Burnett, Nick Cowley, "A Single-Chip Tuner for DVB-T", IEEE Journal of Solid-State Circuits, vol. 38, No. 8, Aug. 2003, pp. 1307-1317.
EICTA—European Industry Association, Information Systems Communication Technologies Consumer Electronics, EICTA/TAC/MBRAI-0216, "Mobile and Portable DVB-T Radio Access Interface Specification", Version 1.0, Jan. 1, 2004, pp. 1-46.

*Primary Examiner* — Thanh Le
(74) *Attorney, Agent, or Firm* — McAndrews, Held & Malloy, Ltd.

(57) ABSTRACT

Aspects of a method and system for an RF front-end calibration scheme using signals from a fractional-N frequency synthesized and received signal strength indicator (RSSI) are provided. A frequency synthesizer within a wireless receiver may generate a signal for dynamically modifying a gain in an integrated low-noise amplifier (LNA) for each selected receiver channel. The frequency-synthesized signals may be applied to at least one tunable load communicatively coupled to the LNA. The tunable load may be an input load or an output load. The signal generated by the frequency synthesizer may be sequentially applied to the input load and the output load. A logarithmic amplifier may generate an RSSI signal from the LNA output during the calibration process. The RSSI signal may be utilized for controlling a tunable load coupled to the LNA and optimize the tuning of the LNA in a desired channel by adjusting the tunable load.

22 Claims, 10 Drawing Sheets

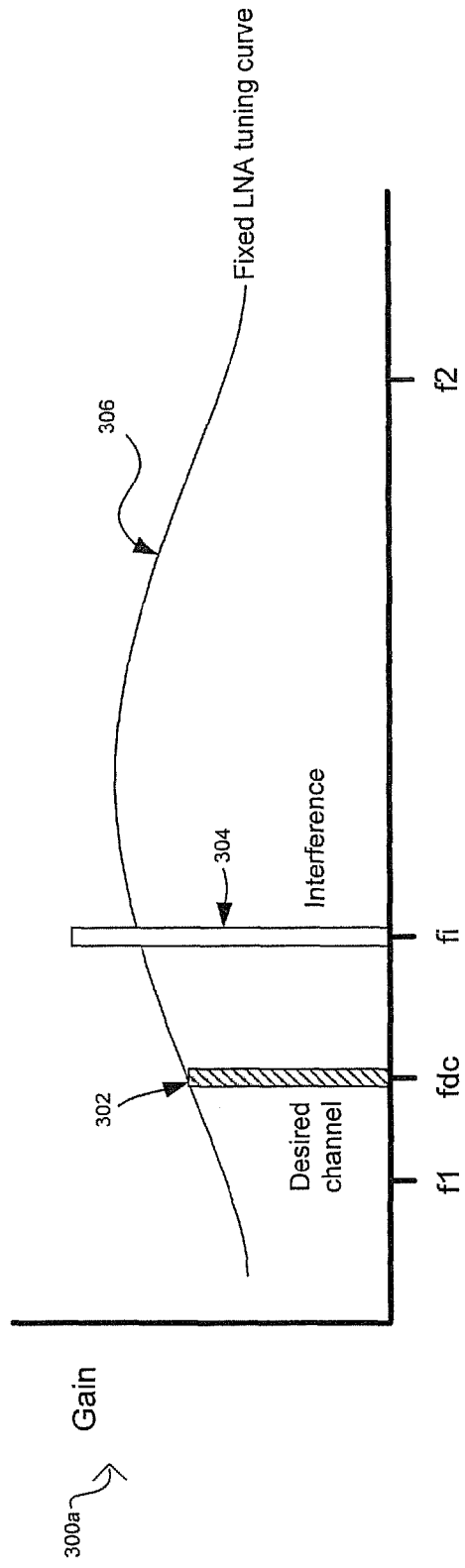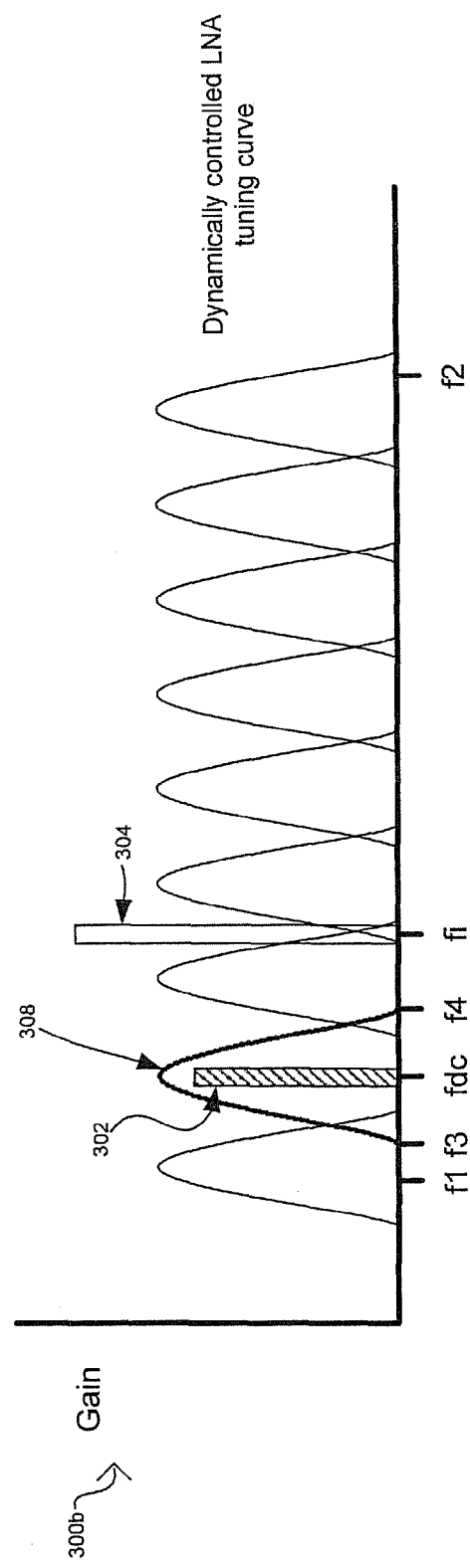
FIG. 3A
FIG. 3B

METHOD AND SYSTEM FOR RF FRONT-END CALIBRATION SCHEME USING FRACTIONAL-N FREQUENCY SYNTHESIZED SIGNALS AND RSSI

CROSS-REFERENCE TO RELATED APPLICATIONS/INCORPORATION BY REFERENCE

This application is a continuation of U.S. application Ser. No. 11/432,450 filed May 11, 2006, which makes reference to, claims priority to, and claims the benefit of U.S. Provisional Application Ser. No. 60/778,232 filed on Mar. 2, 2006.

This patent application makes reference to:
U.S. patent application Ser. No. 11/385,390 filed Mar. 21, 2006;
U.S. patent application Ser. No. 11/385,423 filed Mar. 21, 2006; and
U.S. patent application Ser. No. 11/431,960 filed on even date herewith.

The above stated applications are hereby incorporated by reference in their entirety.

FIELD OF THE INVENTION

Certain embodiments of the invention relate to on-chip RF tuners. More specifically, certain embodiments of the invention relate to a method and system for an RF front-end calibration scheme using signals from a fractional-N frequency synthesizer and a received signal strength indicator (RSSI).

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The OFDM spread spectrum technique may be utilized to distribute information over many carriers that are spaced apart at specified frequencies. The OFDM technique may also be referred to as multi-carrier or discrete multi-tone modulation. This technique may result in spectral efficiency and lower multi-path distortion, for example. The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area single frequency network (SFN). There are also significant challenges in deploying broadcast services to mobile user equipment. Because of form factor constraints, many handheld portable devices, for example, may require that PCB area be minimized and that services consume minimum power to extend battery life to a level that may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H). The broadcasting frequencies for Europe are in UHF (bands IV/V) and in the US, the 1670-1675 MHz band that has been allocated for DVB-H operation. Additional spectrum is expected to be allocated in the L-band world-wide. Broadcasting frequencies for VHF channels may range between 174-240 MHZ, for example.

To meet requirements for mobile broadcasting the DVB-H specification supports time slicing to reduce power consumption at the user equipment, addition of a 4K mode to enable network operators to make tradeoffs between the advantages of the 2K mode and those of the 8K mode, and an additional level of forward error correction on multi-protocol encapsulated data-forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM).

While several adaptations have been made to provide support for mobile broadcast capabilities in DVB-T, concerns regarding device size, cost, and/or power requirements still remain significant constraints for the implementation of handheld portable devices enabled for digital video broadcasting operations. For example, typical DVB-T tuners or receivers in mobile terminals may employ super-heterodyne architectures with one or two intermediate frequency (IF) stages and direct sampling of the passband signal for digital quadrature down-conversion. Moreover, external tracking and SAW filters may generally be utilized for channel selection and image rejection. Such approaches may result in increased power consumption and high external component count, which may limit their application in handheld portable devices. As a result, the success of mobile broadcast capability of DVB-T may depend in part on the ability to develop TV tuners that have smaller form factor, are produced at lower cost, and consume less power during operation.

In the presence of large blocker signals, the gain of the low noise amplifiers (LNAs), and other components of the receiver have to be very linear, that is, the output has to have a linear relationship with the input, to maintain the performance of the receiver. This causes increased power consumption by the receiver due to the highly linear characteristics of various components in the receiver. Blocker signals are unwanted signals in frequency channels outside the wanted channel that disturb the reception of the wanted signals. This happens due to the fact that the blockers generate large signals within the receiver path. These large signals may introduce harmonics and intermodulation products or unwanted mixing products that causes crosstalk with the wanted signals. Similarly, when the required RF signal is weak, there is an increase in the power consumption of the receiver to achieve a good noise factor (NF) and a good phase noise. In handheld communication devices such as cell phones, and smart phones, the increased power consumption may significantly drain the battery that powers these devices.

Moreover, the gain in the LNA may be different for the wanted channel and for the blocker or interference signal. An LNA is usually "tuned" for a specific frequency range and may be difficult for the LNA to achieve optimal performance for a wide frequency range in the presence of blocker signals. In some instances, for example, the gain provided to the blocker signal may be larger than for the wanted channel when the LNA operates over a wide frequency range. This in turn further affects the harmonics and intermodulation products or unwanted mixing products that crosstalk with the wanted signals. Developing mechanisms that enable control of the LNA gain outside the wanted channel may be necessary in order to improve the performance of RF receivers in high bit rate data transmission applications, such as DVB-H applications, for example.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an RF front-end calibration scheme using signals from a fractional-N frequency synthesizer and a received signal strength indicator (RSSI), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A is a diagram illustrating an exemplary fixed tuning curve for an integrated LNA in a multi-band RF receiver, in connection with an embodiment of the invention.

FIG. 3B is a diagram illustrating an exemplary dynamically controlled tuning curve for an integrated LNA in a multi-band RF receiver, in accordance with an embodiment of the invention.

DETAILED DESCRIPTION OF THE INVENTION

Certain embodiments of the invention may be found in a method and system for an RF front-end calibration scheme using fractional-N frequency synthesized signals and a received signal strength indicator (RSSI). Aspects of the invention may comprise a frequency synthesizer within a wireless receiver that may generate a signal that may be utilized to dynamically modify a gain in an integrated low-noise amplifier (LNA) for each selected receiver channel. The frequency-synthesized signals may be applied to at least one tunable input and/or at least one tunable output load communicatively coupled to the LNA. The signal generated by the frequency synthesizer may be sequentially applied to the tunable input load and the tunable output load. A logarithmic amplifier connected to the output of the LNA, may generate an RSSI signal during the calibration process, which is proportional to the signal power at the output of the LNA. The RSSI signal may be processed by a control block that subsequently generates at least one signal for controlling a tunable load communicatively coupled to the LNA.

Figure 1A:
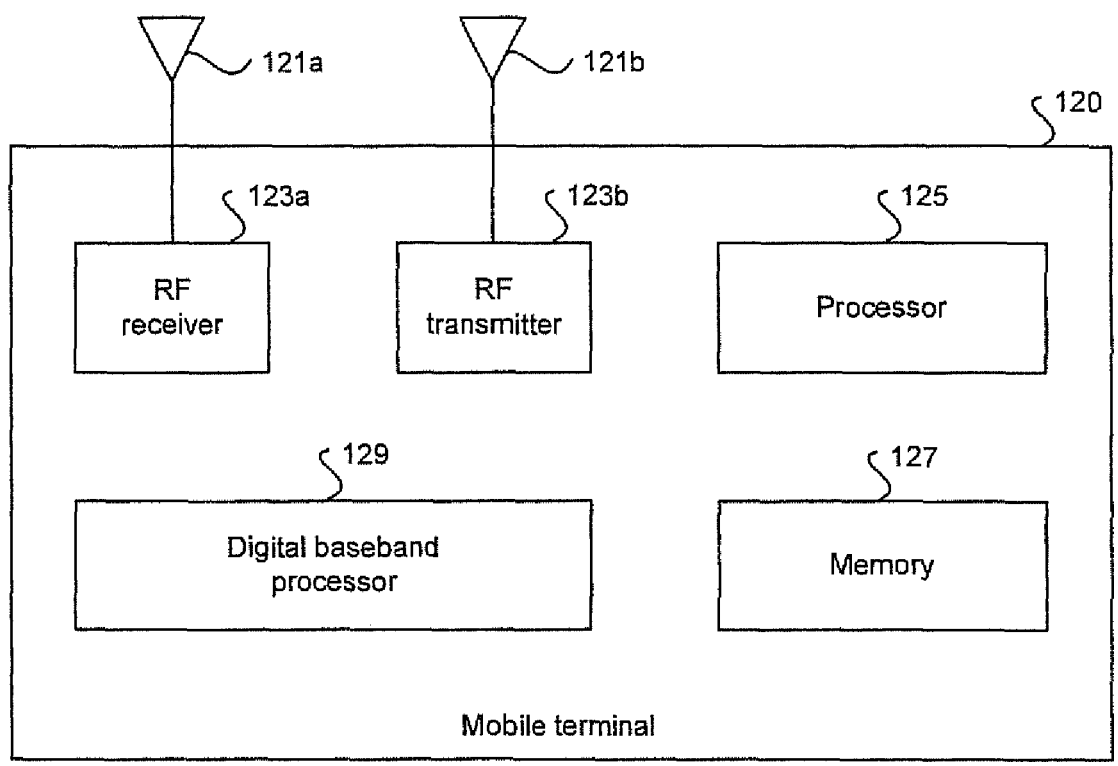
FIG. 1A is a block diagram illustrating an exemplary mobile terminal, accordance with an embodiment of the invention.

FIG. 1A is a block diagram illustrating an exemplary mobile terminal, in accordance with an embodiment of the invention. Referring to FIG. 1A, there is shown a mobile terminal 120 that may comprise an RF receiver 123a, an RF transmitter 123b, a digital baseband processor 129, a processor 125, and a memory 127. A receive antenna 121a may be communicatively coupled to the RF receiver 123a. A transmit antenna 121b may be communicatively coupled to the RF transmitter 123b. The mobile terminal 120 may be operated in a system, such as the cellular network and/or digital video broadcast network, for example. The U.S. application Ser. No. 11/385,390 filed on Mar. 21, 2006, discloses a cellular network and/or digital video broadcast network in reference to a method and system for a multi-band direct conversion CMOS mobile cellular television tuner, and is hereby incorporated herein by reference in its entirety.

The RF receiver 123a may comprise suitable logic, circuitry, and/or code that may enable processing of received RF signals. The RF receiver 123a may enable receiving RF signals in a plurality of frequency bands. For example, the RF receiver 123a may enable receiving DVB-H transmission signals via the UHF band, from about 470 MHz to about 890 MHz, the 1670-1675 MHz band, and/or the L-band, from about 1400 MHz to about 1700 MHz, for example. Moreover, the RF receiver 123a may enable receiving signals in cellular frequency bands, for example. Each frequency band supported by the RF receiver 123a may have a corresponding front-end circuit for handling low noise amplification and down conversion operations, for example. In this regard, the RF receiver 123a may be referred to as a multi-band receiver when it supports more than one frequency band. In another embodiment of the invention, the mobile terminal 120 may comprise more than one RF receiver 123a, wherein each of the RF receiver 123a may be a single-band or a multi-band receiver.

The RF receiver 123a may quadrature down convert the received RF signal to a baseband frequency signal that comprises an in-phase (I) component and a quadrature (Q) component. The RF receiver 123a may perform direct down conversion of the received RF signal to a baseband frequency signal, for example. In some instances, the RF receiver 123a may enable analog-to-digital conversion of the baseband signal components before transferring the components to the digital baseband processor 129. In other instances, the RF receiver 123a may transfer the baseband signal components in analog form.

The digital baseband processor 129 may comprise suitable logic, circuitry, and/or code that may enable processing and/or handling of baseband frequency signals. In this regard, the digital baseband processor 129 may process or handle signals received from the RF receiver 123a and/or signals to be transferred to the RF transmitter 123b, when the RF transmitter 123b is present, for transmission to the network. The digital baseband processor 129 may also provide control and/or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network.

The RF transmitter 123b may comprise suitable logic, circuitry, and/or code that may enable processing of RF signals for transmission. The RF transmitter 123b may enable transmission of RF signals in a plurality of frequency bands. Moreover, the RF transmitter 123b may enable transmitting signals in cellular frequency bands, for example. Each frequency band supported by the RF transmitter 123b may have a corresponding front-end circuit for handling amplification and up conversion operations, for example. In this regard, the RF transmitter 123b may be referred to as a multi-band transmitter when it supports more than one frequency band. In another embodiment of the invention, the mobile terminal 120 may comprise more than one RF transmitter 123b, wherein each of the RF transmitter 123b may be a single-band or a multi-band transmitter.

The RF transmitter 123b may quadrature up convert the baseband frequency signal comprising I/Q components to an RF signal. The RF transmitter 123b may perform direct up conversion of the baseband frequency signal to a baseband frequency signal, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, and/or code that may enable control and/or data processing operations for the mobile terminal 120. The processor 125 may be utilized to control at least a portion of the RF receiver 123a, the RF transmitter 123b, the digital baseband processor 129, and/or the memory 127. In this regard, the processor 125 may generate at least one signal for controlling operations within the mobile terminal 120. The processor 125 may also enable executing of applications that may be utilized by the mobile terminal 120. For example, the processor 125 may execute applications that may enable displaying and/or interacting with content received via DVB-H transmission signals in the mobile terminal 120.

The memory 127 may comprise suitable logic, circuitry, and/or code that may enable storage of data and/or other information utilized by the mobile terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the mobile terminal 120. For example, the memory 127 may comprise information necessary to configure the RF receiver 123a to enable receiving DVB-H transmission in the appropriate frequency band.

Figure 1B:
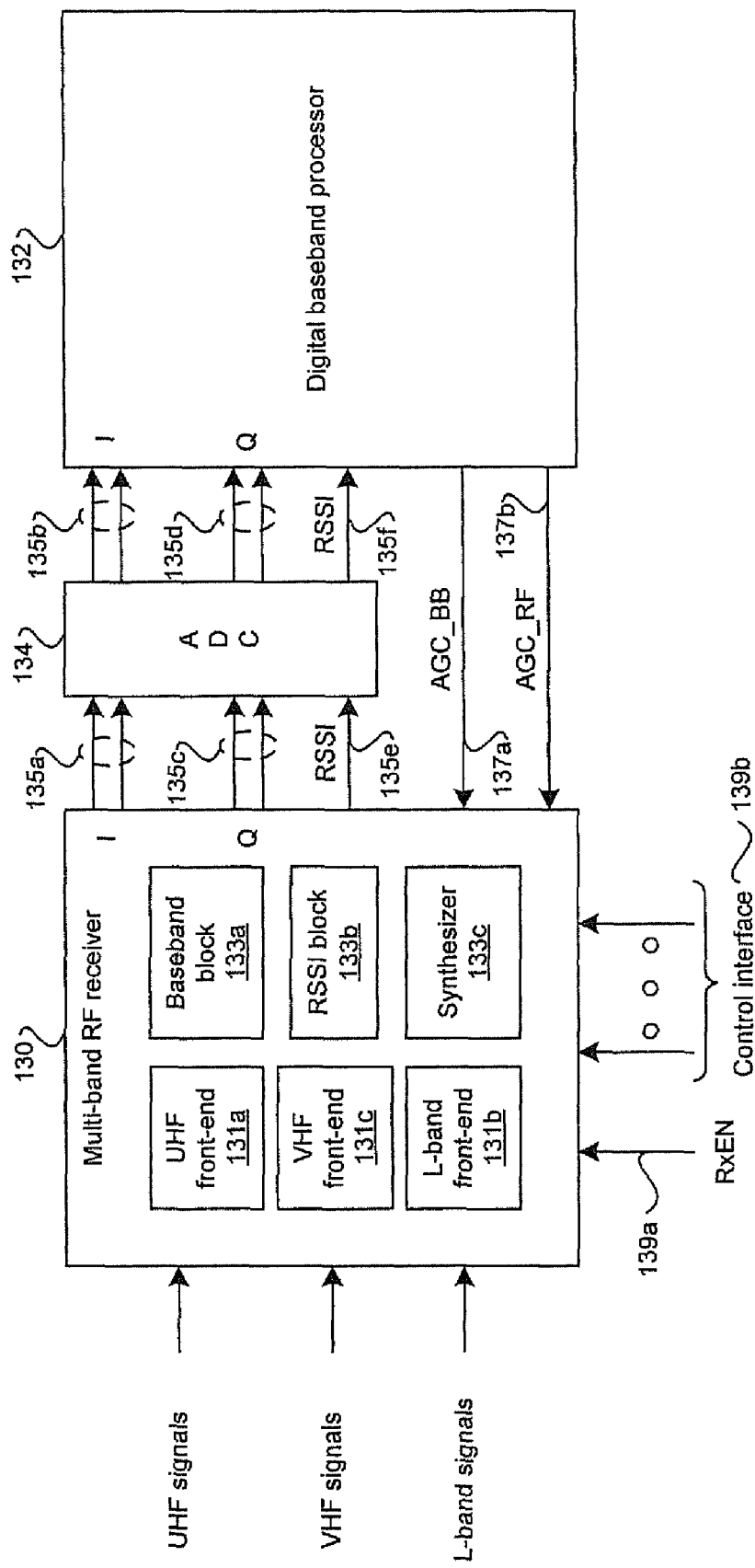
FIG. 1B is a block diagram illustrating exemplary communication between a multi-band RF receiver and a digital baseband processor in a mobile terminal, in accordance with an embodiment of the invention.

FIG. 1B is a block diagram illustrating exemplary communication between a multi-band RF receiver and a digital baseband processor in a mobile terminal, in accordance with an embodiment of the invention. Referring to FIG. 1B, there is shown a multi-band RF receiver 130, a multi-channel analog-to-digital converter (ADC) 134, and a digital baseband processor 132. The multi-band RF receiver 130 may comprise a UHF front-end 131a, an L-band front-end 131b, a VHF front-end 131c, a baseband block 133a, a received signal strength indicator (RSSI) block 133b, and a synthesizer 133c. The multi-band RF receiver 130, the analog-to-digital converter (ADC) 134, and/or the digital baseband processor 132 may be part of a mobile terminal, such as the mobile terminal 120 in FIG. 1A, for example.

The multi-band RF receiver 130 may comprise suitable logic, circuitry, and/or code that may enable handling of UHF, VHF, and L-band signals. The multi-band RF receiver 130 may be enabled via an enable signal, such as the signal RxEN 139a, for example. In this regard, enabling the multi-band RF receiver 130 via the signal RxEN 139a by a 1:10 ON/OFF ratio may allow time slicing in DVB-H while reducing power consumption. At least a portion of the circuitry within the multi-band RF receiver 130 may be controlled via the control interface 139b. The control interface 139b may receive information from, for example, a processor, such as the processor 125 in FIG. 1A, or from the digital baseband processor 132. The control interface 139b may comprise more than one bit. For example, when implemented as a 2-bit interface, the control interface 139a may be an inter-integrated circuit (I2C) interface.

The UHF front-end 131a may comprise suitable logic, circuitry, and/or code that may enable low noise amplification and direct down conversion of UHF signals. In this regard, the UHF front-end 131a may utilize an integrated low noise amplifier (LNA) and mixers, such as passive mixers, for example. The UHF front-end 131a may communicate the resulting baseband frequency signals to the baseband block 133a for further processing.

The L-band front-end 131b may comprise suitable logic, circuitry, and/or code that may enable low noise amplification and direct down conversion of L-band signals. In this regard, the L-band front-end 131b may utilize an integrated LNA and mixers, such as passive mixers, for example. The L-band front-end 131b may communicate the resulting baseband frequency signals to the baseband block 133a for further processing.

The VHF front-end 131c may comprise suitable logic, circuitry, and/or code that may enable low noise amplification and direct down conversion of VHF signals. In this regard, the VHF front-end 131c may utilize an integrated low noise amplifier (LNA) and mixers, such as passive mixers, for example. The VHF front-end 131c may communicate the resulting baseband frequency signals to the baseband block 133a for further processing. The multi-band RF receiver 130 may enable one of the UHF front-end 131a, the L-band front-end 131b, and the VHF front-end 131c based on current communication conditions.

The synthesizer 133c may comprise suitable logic, circuitry, and/or code that may enable generating the appropriate local oscillator (LO) signal for performing direct down conversion in the UHF front-end 131a, the L-band front-end 131b, or the VHF front-end 131c. Since the synthesizer 133c may enable fractional multiplication of a source frequency when generating the LO signal, a large range of crystal oscillators may be utilized as a frequency source for the synthesizer 133c. This approach may enable the use of an existing crystal oscillator in a mobile terminal PCB, thus reducing the number of external components necessary to support the operations of the multi-band RF receiver 130, for example. The synthesizer 133 may generate a common LO signal for the UHF front-end 131a, the L-band front-end 131b, and the VHF front-end 131c. In this regard, the UHF front-end 131a, the L-band front-end 131b, and the VHF front-end 131c may enable dividing the LO signal in order to generate the appropriate signal to perform down conversion from the UHF band, the L-band, and the VHF band respectively. In some instances, the synthesizer 133 may have at least one integrated voltage controlled oscillator (VCO) for generating the LO signal. In other instances, the VCO may be implemented outside the synthesizer 133.

The baseband block 133a may comprise suitable logic, circuitry, and/or code that may enable processing of I/Q components generated from the direct down conversion operations in the UHF front-end 131a, L-band front-end 131b, and the VHF front-end 131c. The baseband block 133a may enable amplification and/or filtering of the I/Q components in analog form. The baseband block 133a may communicate the processed I component, that is, signal 135a, and the processed Q component, that is, signal 135c, to the multi-channel ADC 134 for digital conversion.

The RSSI block 133b may comprise suitable logic, circuitry, and/or code that may enable measuring the strength, that is, the RSSI value, of a received RF signal, whether UHF, L-band, or VHF signal. The RSSI block 133b may be implemented based on a logarithmic amplifier, for example. The RSSI measurement may be performed, for example, after the received RF signal is amplified in the UHF front-end 131a, the L-band front-end 131b, or the VHF front-end 131c. The RSSI block 133b may communicate the analog RSSI measurement, that is, signal 135e, to the multi-channel ADC 134 for digital conversion.

The multi-channel ADC 134 may comprise suitable logic, circuitry, and/or code that may enable digital conversion of signals 135a, 135c, and/or 135e to signals 135b, 135d, and/or 135f respectively. In some instances, the multi-channel ADC 134 may be integrated into the multi-band RF receiver 130 or into the digital baseband processor 132.

The digital baseband processor 132 may comprise suitable logic, circuitry, and/or code that may enable processing and/or handling of baseband frequency signals. In this regard, the digital baseband processor 132 may be the same or substantially similar to the digital baseband processor 129 described in FIG. 1A. The digital baseband processor 132 may enable generating at least one signal, such as the signals AGC_BB 137a and AGC_RF 137b, for adjusting the operations of the multi-band RF receiver 130. For example, the signal AGC_BB 137a may be utilized to adjust the gain provided by the baseband block 133a on the baseband frequency signals generated from the UHF front-end 131a, the L-band front-end 131b, or the VHF front-end 131c. In another example, the signal AGC_RF 137b may be utilized to adjust the gain provided by an integrated LNA in the UHF front-end 131a, the L-band front-end 131b, or the VHF front-end 131c. In this regard, the signal AGC_RF 137b may be utilized to adjust the gain during a calibration mode, for example. In another example, the digital baseband processor 132 may generate at least one control signal or control information communicated to the multi-band RF receiver 130 via the control interface 139b for adjusting operations within the multi-band RF receiver 130.

Figure 1C:
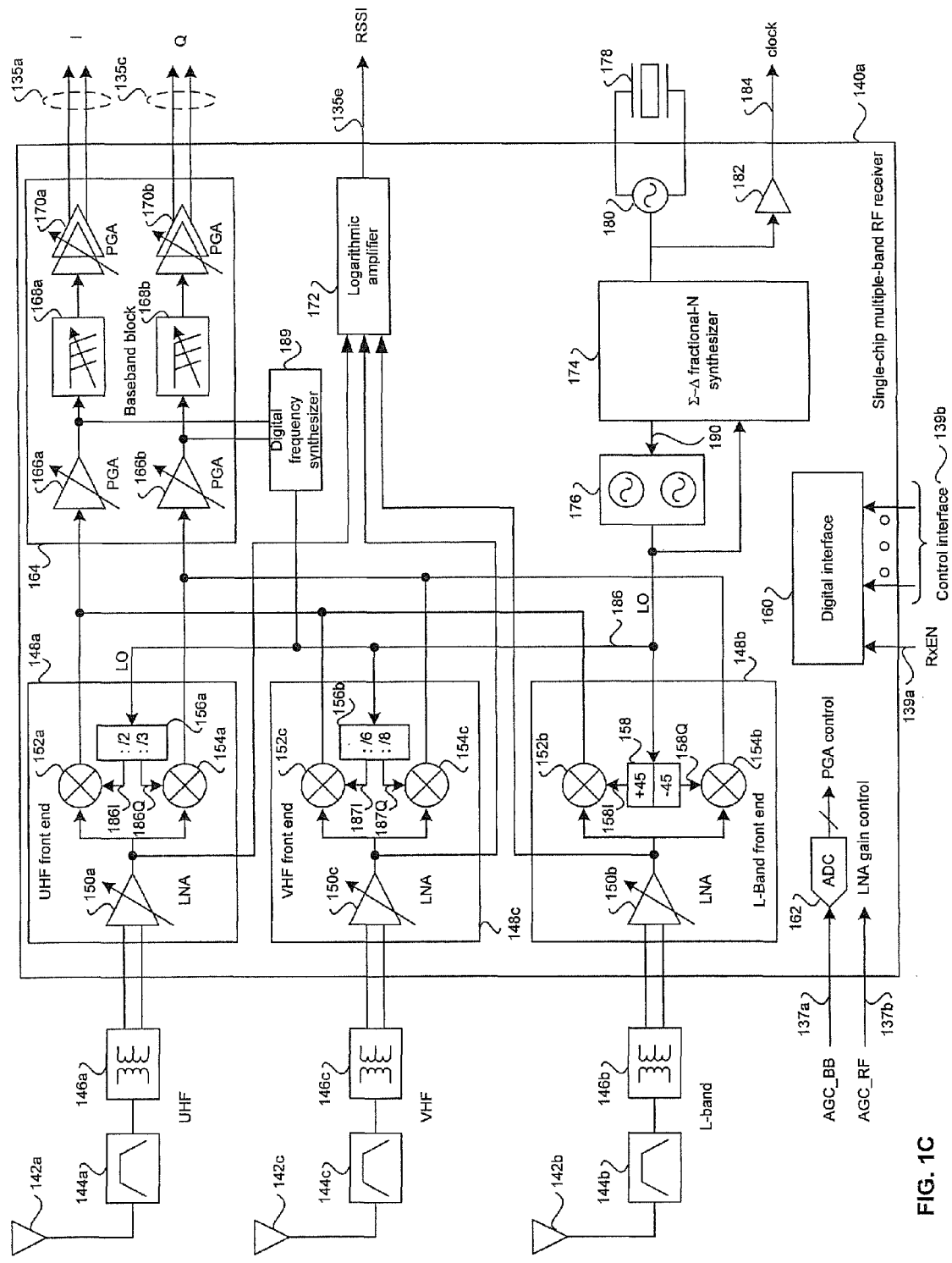
FIG. 1C is a block diagram illustrating an exemplary single-chip multi-band RF receiver with an integrated LNA in each front-end, in accordance with an embodiment of the invention.

FIG. 1C is a block diagram illustrating an exemplary single-chip multi-band RF receiver with an integrated LNA in each front-end, in accordance with an embodiment of the invention. Referring to FIG. 1C, there is shown a single-chip multi-band RF receiver 140a that may comprise a UHF front-end 148a, an L-band front-end 148b, a VHF front-end 148c, a baseband block 164, a logarithmic amplifier 172, a digital frequency synthesizer 189, a $\Sigma$-$\Delta$ fractional-N synthesizer 174, a VCO block 176, a digital interface 160, an ADC 162, an oscillator 180, and a buffer 182.

The single-chip multi-band RF receiver 140a may be fabricated using any of a plurality of semiconductor manufacturing processes, for example, complimentary metal-oxide-semiconductor (CMOS) processes, bipolar CMOS (BiCMOS), or Silicon Germanium (SiGe). The single-chip multi-band RF receiver 140a may be implemented using differential structures to minimize noise effects and/or substrate coupling, for example. The single-chip multi-band RF receiver 140a may utilize low drop out (LDO) voltage regulators to regulate and clean up on-chip voltage supplies. In this regard, the LDO voltage regulators may be utilized to transform external voltage sources to the appropriate on-chip voltages.

When the single-chip multi-band RF receiver 140a is implemented utilizing a CMOS process, some design considerations may include achieving low noise figure (NF) values, wide-band operation, high signal-to-noise ration (SNR), performing DC offset removal, achieving high input second-order and third-order intercept points (IIP2 and IIP3), and/or reducing I/Q mismatch, for example.

The single-chip multi-band RF receiver 140a may receive UHF signals via a first antenna 142a, a UHF filter 144a, and a first balum 146a. The UHF filter 144a enables band pass filtering, wherein the band pass may be about 470 to about 702 MHz for cellular signals, for example, or about 470 to about 862 MHz, for other types of received signals, for example. The balum 146a enables balancing the filtered signals before being communicated to the UHF front-end 148a.

The single-chip multi-band RF receiver 140a may receive L-band signals via a second antenna 142b, an L-band filter 144b, and a second balum 146b. The L-band filter 144b enables band pass filtering, wherein the band pass may be about 1670 to about 1675 MHz for signals in US systems, for example, or about 1450 to about 1490 MHz, for signals in European systems, for example. The balum 146b enables balancing the filtered signals before being communicated to the L-band front-end 148a.

The single-chip multi-band RF receiver 140a may receive VHF signals via a third antenna 142c, a VHF filter 144c, and a third balum 146c. The VHF filter 144c enables band pass filtering, wherein the band pass may be about 174 to about 240 MHz for signals in US systems, for example. The balum 146c enables balancing the filtered signals before being communicated to the VHF front-end 148c. In some instances, antennas 142a, 142b and 142c may be implemented utilizing a single antenna communicatively coupled to the single-chip multi-band RF receiver 140a that may support receiving radio signals operating in the UHF, L-band, and/or VHF frequencies, for example.

The UHF front-end 148a may comprise a variable gain low noise amplifier (LNA) 150a, a mixer 152a, a mixer 154a, and a LO signal divider 156a. The variable gain LNA 150a may comprise suitable logic and/or circuitry that may enable amplification of the UHF signals received. Matching between the output of the balum 146a and the input of the variable gain LNA 150a may be achieved by utilizing off-chip series inductors, for example. The variable gain LNA 150a may implement continuous gain control by current steering that may be controlled by a replica scheme within the variable gain LNA 150a. The gain of the variable gain LNA 150a may be adjusted via the signal AGC_RF 137b, for example. In this regard, the gain of the variable gain LNA 150a may be adjusted during a calibration mode for each selected desired channel of operation within the frequency range provided by the UHF front-end 148a, for example.

The mixers 152a and 154a may comprise suitable logic and/or circuitry that may enable generating in-phase (I) and quadrature (Q) components of the baseband frequency signal based on direct down conversion of the amplified received UHF signal with the quadrature signals 186I and 186Q generated by the divider block 156a. The mixers 152a and 154a may be passive mixers in order to achieve high linearity and/or low flicker noise, for example. The LO signal divider 156a may comprise suitable logic, circuitry, and/or code that may enable dividing of the LO signal 186 by a factor of 2 (:/2) or a factor of 3 (:/3) and at the same time provide quadrature outputs 186I and 186Q, wherein 186I and 186Q have 90 degrees separation between them. The factor of 3 division may be used when the received UHF signal band is about 470 to about 600 MHz, for example. The factor of 2 division may be used when the received UHF signal band is about 600 to about 900 MHz, for example. The I/Q components generated by the mixers 152a and 154a may be communicated to the baseband block 164.

The L-band front-end 148b may comprise a variable gain LNA 150b, a mixer 152a, a mixer 154a, and a LO signal generator 158. The variable gain LNA 150a may comprise suitable logic and/or circuitry that may enable amplification of the L-band signals received. Matching between the output of the balum 146b and the input of the variable gain LNA 150b may be achieved by utilizing off-chip series inductors, for example. The variable gain LNA 150b may implement continuous gain control by current steering that may be controlled by a replica scheme within the variable gain LNA 150b. The gain of the variable gain LNA 150b may be adjusted via the signal AGC_RF 137b, for example. In this regard, the gain of the variable gain LNA 150b may be adjusted during a calibration mode for each selected desired channel of operation within the frequency range provided by the L-band front-end 148b, for example.

The mixers 152b and 154b may comprise suitable logic and/or circuitry that may enable generating I/Q components of the baseband frequency signal based on the direct down conversion of the amplified received L-band signal with the LO signals 158I and 158Q generated by the LO generator block 158. The mixers 152b and 154b may be passive mixers in order to achieve high linearity and/or low flicker noise, for example. The LO signal generator 158 may comprise suitable logic, circuitry, and/or code that may enable generation of quadrature LO signals 158I and 158Q, that is, signals with 90 degree phase split between them, from the LO signal 186. The I/Q components generated by the mixers 152b and 154b may be communicated to the baseband block 164.

The VHF front-end 148c may comprise a variable gain LNA 150c, a mixer 152c, a mixer 154c, and a LO signal divider 156b. The variable gain LNA 150c may comprise suitable logic and/or circuitry that may enable amplification of the VHF signals received. Matching between the output of the balum 146c and the input of the variable gain LNA 150c may be achieved by utilizing off-chip series inductors, for example. The variable gain LNA 150c may implement continuous gain control by current steering that may be controlled by a replica scheme within the variable gain LNA 150c. The gain of the variable gain LNA 150c may be adjusted via the signal AGC_RF 137b, for example. In this regard, the gain of the variable gain LNA 150c may be adjusted during a calibration mode for each selected desired channel of operation within the frequency range provided by the VHF front-end 148c, for example.

The mixers 152c and 154c may comprise suitable logic and/or circuitry that may enable generating in-phase (I) and quadrature (Q) components of the baseband frequency signal based on direct down conversion of the amplified received VHF signal with the quadrature signals 187I and 187Q generated by the divider block 156b. The mixers 152c and 154c may be passive mixers in order to achieve high linearity and/or low flicker noise, for example. The LO signal divider 156b may comprise suitable logic, circuitry, and/or code that may enable dividing of the LO signal 186 by a factor of 6 (:/6) or a factor of 8 (:/8) and at the same time provide quadrature outputs 187I and 187Q, wherein 187I and 187Q are 90 degrees out of phase with each other. The factor of 8 division may be used when the received VHF signal band is about 174 to about 200 MHz, for example. The factor of 6 division may be used when the received VHF signal band is about 200 to about 240 MHz, for example. The I/Q components generated by the mixers 152c and 154c may be communicated to the baseband block 164.

The logarithmic amplifier 172 may comprise suitable logic, circuitry, and/or code that may enable generation of a wideband, received signal strength indicator (RSSI) signal, such as the signal 135e, based on the output of the variable gain LNA 150a, the variable gain LNA 150b, or the variable gain LNA 150c, for example. The RSSI signal indicates the total amount of signal power that is present at the output of the LNA, for example. The RSSI signal may be utilized by, for example, the digital baseband processor 132 in FIG. 1B, to adjust the gain of a variable gain LNA in the presence of RF interference to achieve NF and/or linearity performance that meets blocking and/or intermodulation specifications, for example. In this regard, interference may refer to blocker signals, for example. Blocker signals may be unwanted signals in frequency channels outside the wanted or desired channel that may disturb the reception of the wanted signals. This effect may be a result of blockers generating large signals within the receiver path. These large signals may introduce harmonics, intermodulation products, and/or unwanted mixing products that crosstalk with the wanted signals.

The baseband block 164 may comprise an in-phase component processing path and a quadrature component processing path. The in-phase processing path may comprise at least one programmable gain amplifier (PGA) 166a, a baseband filter 168a, and at least one PGA 170a. The quadrature component processing path may comprise at least one PGA 166b, a baseband filter 168b, and at least one PGA 170b. The PGAs 166a, 166b, 170a, and 170b may comprise suitable logic, circuitry, and/or code that may enable amplification of the down converted components of the baseband frequency signal generated by the RF front-end. The gain of the PGAs 166a, 166b, 170a, and 170b may be digitally programmable. In addition, at the output of the PGAs 166a and 166b, a programmable pole may be utilized to reduce linearity requirements for the baseband filters 168a and 168b respectively. Since the static and time-varying DC offset may saturate the operation of the single-chip multi-band RF receiver 140a, the PGAs 166a, 166b, 170a, and 170b may utilize DC servo loops to address DC offset issues. The gain of the PGAs 166a, 166b, 170a, and/or 170b may be controlled via the AGC_BB signal 137a, for example. In this regard, the ADC 162 may be utilized to provide digital control of the PGAs 166a, 166b, 170a, and/or 170b when the AGC_BB signal 137a is an analog signal.

The baseband filters 168a and 168b may comprise suitable logic, circuitry, and/or code that may enable channel selection, for example. Channel selection may be performed by filters, such as an $N^{th}$ order lowpass Chebyschev filter implemented by active integrators in a leapfrog configuration, for example. For the correct tuning of the characteristics of the filters, an on-chip auto-calibration loop may be activated upon power-up. The auto-calibration loop may set up the corner frequency to the correct vale required to meet the requirements of the communications standard for which the receiver is designed. For DVB-T/DVB-H, the value $f_o$ of the filter response may be set to a value from 2.5 to 4 MHz thus supporting the different channel bandwidths of 5-8 MHz specified by DVB-T/DVB-H standards. During auto-calibration, a tone at the appropriate $f_{-3\,db}$ may be generated on-chip and may be applied at the input of the baseband filters 168a and 168b for comparison with the filter output of a root-mean-squared (RMS) detector. A digitally controlled loop may be utilized to adjust the baseband filter bandwidth until the output of the baseband filter and the RMS detector are the same.

The Σ-Δ fractional-N synthesizer 174 may comprise suitable logic, circuitry, and/or code that may enable LO generation that may be independent of the reference crystal frequency, such as the crystal 178, for example. In this regard, the synthesizer 174 may generate a signal, such as the signal 190, for example, to control the operation of the VCO block 176 and therefore the generation of the LO signal 186. Since the synthesizer 174 may enable fractional synthesis, the single-chip multi-band RF receiver 140a may utilize the same crystal utilized by other operations in the mobile terminal while maintaining fine tuning capability. The synthesizer 174 may receive a reference frequency signal from the crystal 178 via an oscillator 180, for example. The output of the oscillator 180 may also be buffered by the buffer 182 to generate a clock signal 184, for example.

The synthesizer 174 may also be utilized to generate a signal, such as a tone, for example, to calibrate the integrated LNAs in the UHF front-end 148a, the L-band front-end 148b, or the VHF front-end 148c, when a new desired channel is selected for operation. In this regard, the synthesizer 174 may generate a signal with a frequency that corresponds to the desired channel that is selected. The ability of the synthesizer 174 to provide fine tuning capabilities enables the generation of the appropriate signal frequency for a large range of desired channels in the operation of the single-chip multi-band RF receiver 140a.

The VCO block 176 may comprise suitable logic, circuitry, and/or code that may enable generating the LO signal 186 utilized by the UHF front-end 148a, the L-band front-end 148b, the VHF front-end 148c for direct down conversion of the received RF signals and by the digital frequency synthesizer 189. The VCO block 176 may comprise at least one VCO, wherein each VCO may have cross-coupled NMOS and PMOS devices and metal-oxide-semiconductor (MOS) varactors in an accumulation mode for tuning. In this regard, a switched varactor bank may be utilized for providing coarse tuning. The VCO block 176 may provide a range of about 1.2 to about 1.8 GHz when implemented utilizing two VCOs, for example. When more than one VCO is utilized in implementing the VCO block 176, selecting the proper VCO for generating the LO signal 186 may be based on the type of RF signal being received by the single-chip multi-band RF receiver 140a.

The digital interface 160 may comprise suitable logic, circuitry, and/or code that may enable controlling circuitry within the single-chip multi-band RF receiver 140a. The digital interface 160 may comprise a plurality of registers for storing control and/or operational information for use by the single-chip multi-band RF receiver 140a. The digital interface 160 may enable receiving the signal RxEN 139a that may be utilized to perform 1:10 ON/OFF ratio time slicing in DVB-H while reducing power consumption. Moreover, the digital interface 160 may enable receiving the control interface 139b from, for example, a processor, such as the processor 125 in FIG. 1A, or from the digital baseband processor 132 in FIG. 1B. The control interface 139b may comprise more than one bit. The control interface 139b may be utilized to control the synthesis operations of the synthesizer 174 and/or the filtering operations of the baseband filters 168a and 168b. The control interface 139b may also be utilized to adjust the bias of circuits within the single-chip multi-band RF receiver 140a, such as those of the variable gain LNAs 150a, 150b, and 150c the PGAs 166a, 166b, 170a, and 170b, and/or the baseband filters 168a and 168b, for example.

The digital frequency synthesizer 189 may comprise suitable logic, circuitry, and/or code that may enable generation of a reference signal based on a clock timing signal, and on a control input signal. In various embodiments of the invention, the digital frequency synthesizer 189 may implement a look up table (LUT) function wherein a given clock timing signal and control input signal combination may correspond to a frequency, phase, and/or magnitude for a generated reference signal. Data utilized for the LUT function may be stored and/or retrieved from the memory 127 in FIG. 1A, for example. In other embodiments of the invention, the digital frequency synthesizer 189 may comprise an over-sampling digital to analog conversion (DAC) function in which the digital frequency synthesizer 189 performs digital sampling of the clock timing signal. A rate of digital sampling may be determined based on the control input signal.

Figure 1D:
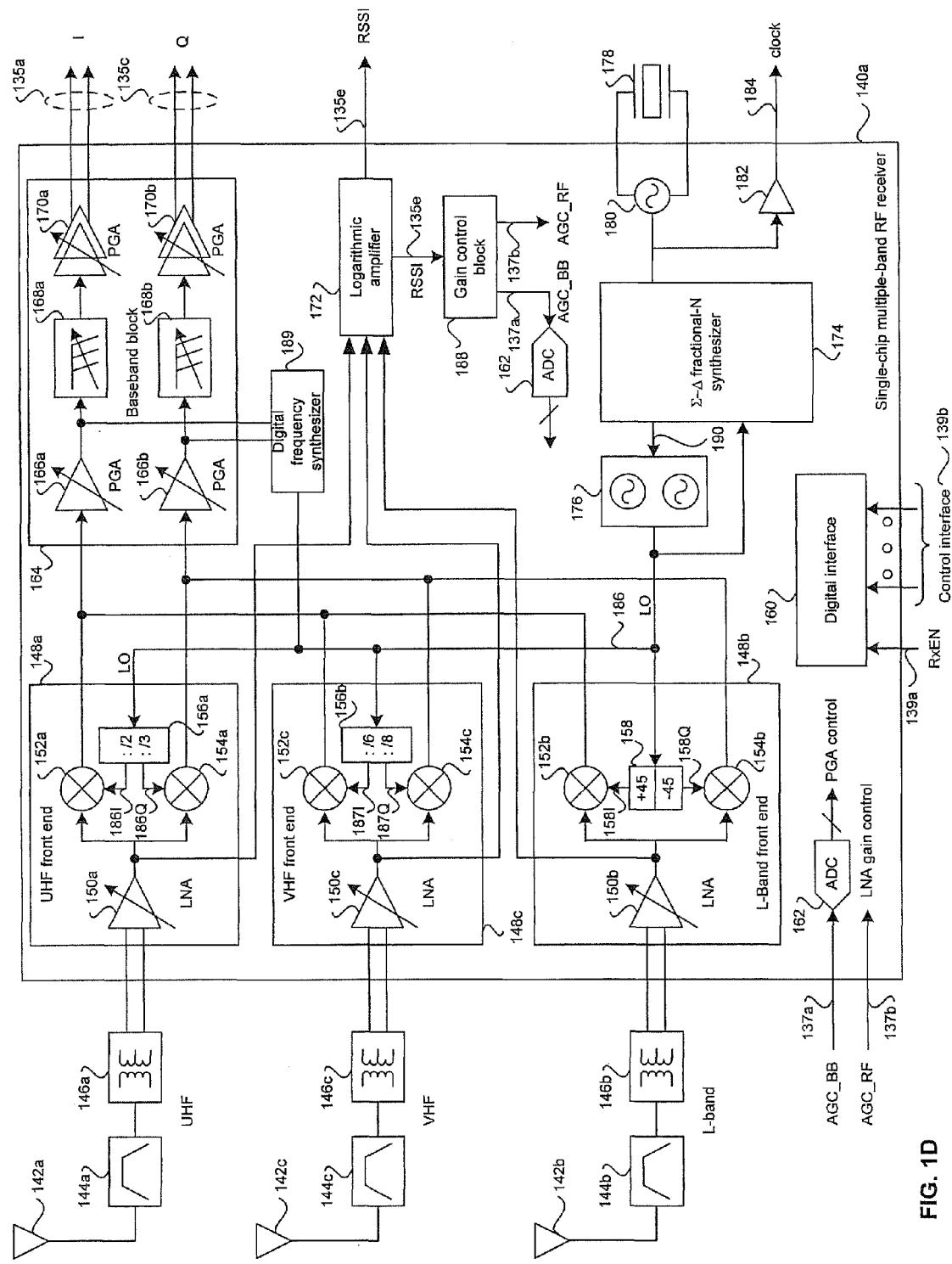
FIG. 1D is a block diagram illustrating an exemplary single-chip multi-band RF receiver with on-chip gain control processing, in accordance with an embodiment of the invention.

FIG. 1D is a block diagram illustrating an exemplary single-chip multi-band RF receiver with on-chip gain control processing, in accordance with an embodiment of the invention. Referring to FIG. 1D, there is shown a single-chip multi-band RF receiver 140b that may differ from the single-chip multi-band RF receiver 140a in FIG. 1C in that a gain control block 186 may be integrated into the single-chip multi-band RF receiver 140b. The gain control block 186 may comprise suitable logic, circuitry, and/or code that may enable on-chip gain adjustment for the variable gain LNAs 150a, 150b, and 150c and for the PGAs 166a, 166b, 170a, and 170b. In this regard, the gain control block 186 may receive the RSSI signal 135e and may generate the signals AGC_BB 137a and AGC_RF 137b, for example.

Figure 2:
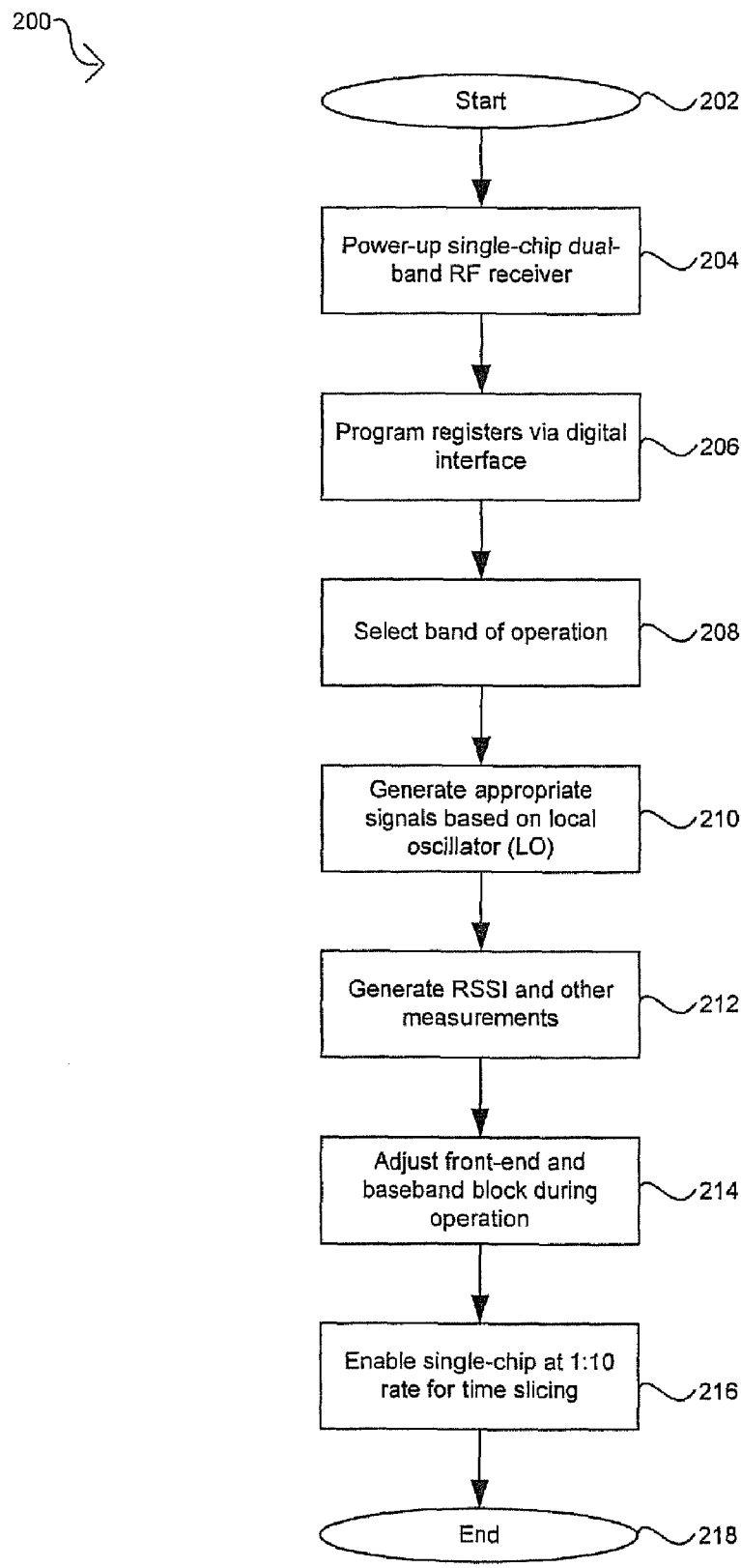
FIG. 2 is a flow diagram illustrating exemplary steps in the operation of a single-chip multi-band RF receiver, in accordance with an embodiment of the invention.

FIG. 2 is a flow diagram illustrating exemplary steps in the operation of a single-chip multi-band RF receiver, in accordance with an embodiment of the invention. Referring to FIG. 2, there is shown a flow diagram 200. In step 204, after start step 202, a single-chip multi-band RF receiver, such as the single-chip multi-band RF receiver 140a and 140b, for example, may be powered up in a mobile terminal. In step 206, the RF receiver may be enabled via signal RxEN 139a and control and/or operational information may be programmed into the digital interface 160 via the control interface 139b for use by the RF receiver during operation.

In step 208, an operating frequency band may be selected via the control interface 139b. In this regard, if the mobile terminal is to receive UHF signals, the UHF front-end 152a, the baseband block 164, and/or the synthesizer 174 may be configured for receiving and processing UHF signals in the RF receiver. If the mobile terminal is to receive L-band signals, the L-band front-end 152b, the baseband block 164, and/or the synthesizer 174 may be configured for receiving and processing L-band signals in the RF receiver. If the mobile terminal is to receive VHF signals, the VHF front-end 152c, the baseband block 164, and/or the synthesizer 174 may be configured for receiving and processing VHF signals in the RF receiver. In step 210, the synthesizer 174 and the VCO block 176 may be utilized to generate the appropriate value for the LO signal 186 base on the band of operation.

In step 214, the RF receiver may measure an RSSI for the output of a variable gain LNA of the currently operating front-end for determining the amount of adjusting or backing off that may be required from the variable gain LNA. The RSSI measurement and corresponding gain adjustment may be performed during a calibration mode that occurs after a new desired channel of operation is selected. The amount of adjusting may be determined off-chip or on-chip as described in FIGS. 1D and 1E respectively. Adjusting the LNA gain based on the RSSI may also be done during and simultaneously with the reception of the broadcast signal, for example the normal 1:10 DVB-H reception mode after step 216. Other measurements may be performed in the front-end circuits 148a and 148b and/or the baseband block 164 that may be utilized to adjust biasing levels within the RF receiver. In step 216, the front-end circuits 148a and 148b and/or the baseband block 164 may be adjusted, when necessary, based on measurements performed in step 214. In step 216, during DVB-H operation, the RF receiver may be enabled utilizing a 1:10 ON/OFF ratio for time slicing in DVB-H and to reduce power consumption. After step 216, the process may proceed to end step 218.

FIG. 3A is a diagram illustrating an exemplary fixed tuning curve for an integrated LNA in a multi-band RF receiver, in connection with an embodiment of the invention. Referring to FIG. 3A, there is shown a graph 300a that corresponds to the gain of an integrated LNA in a RF front-end with a fixed LNA tuning curve 306. The integrated LNA operates in the range comprising the frequencies f1 through f2, for example. For UHF signals, f1 may be approximately 470 MHz and f2 may be approximately 890 MHz, for example. The fixed LNA tuning curve 306 may provide different gains for signals with different frequencies over the entire integrated LNA operating frequency range. Also shown in FIG. 3A are a dashed bar that corresponds to a desired channel signal 302 at frequency fdc and a blank bar that corresponds to an interference or blocking signal 304 at frequency fi. The difference in height between the bar that corresponds to the desired channel signal 302 and the bar that corresponds to the interference signal 304 may indicate a relative difference in signal strength, for example.

In some instances, the gain provided by the fixed LNA tuning curve 306 associated to the desired channel signal 302 and to the interference signal 304 may be such that the signal strength of the interference signal 304, after its corresponding gain is applied, may be comparable to, or even larger than, the signal strength of the desired channel signal 302, after its corresponding gain is applied. When this occurs, the presence of the amplified interference signal 304 in the operating frequency range of the integrated LNA may affect the harmonics and intermodulation products or unwanted mixing products that causes crosstalk with the desired channel signal 302.

FIG. 3B is a diagram illustrating an exemplary dynamically controlled tuning curve for an integrated LNA in a multi-band RF receiver, in accordance with an embodiment of the invention. Referring to FIG. 3B, there is shown a graph 300b that corresponds to the gain of an integrated LNA in a RF front-end with a dynamically controlled tuning curve 308. The integrated LNA operates in the range comprising the frequencies f1 through f2, for example. The dynamically controlled tuning curve 308 may provide different gains for signals with different frequencies over a portion of the integrated LNA operating frequency range. For example, the dynamically controlled tuning curve 308 is shown to provide different gains for signals with corresponding frequencies in the range comprising the frequencies f3 through f4. A signal with a corresponding frequency outside the range provided by the dynamically controlled tuning curve 308 would be attenuated by the integrated LNA. In this regard, the frequency range for the dynamically controlled tuning curve 308 may be programmed to enable the integrated LNA to select a frequency range that amplifies the desired channel 302 and attenuates the interference signal 304.

Figure 4:
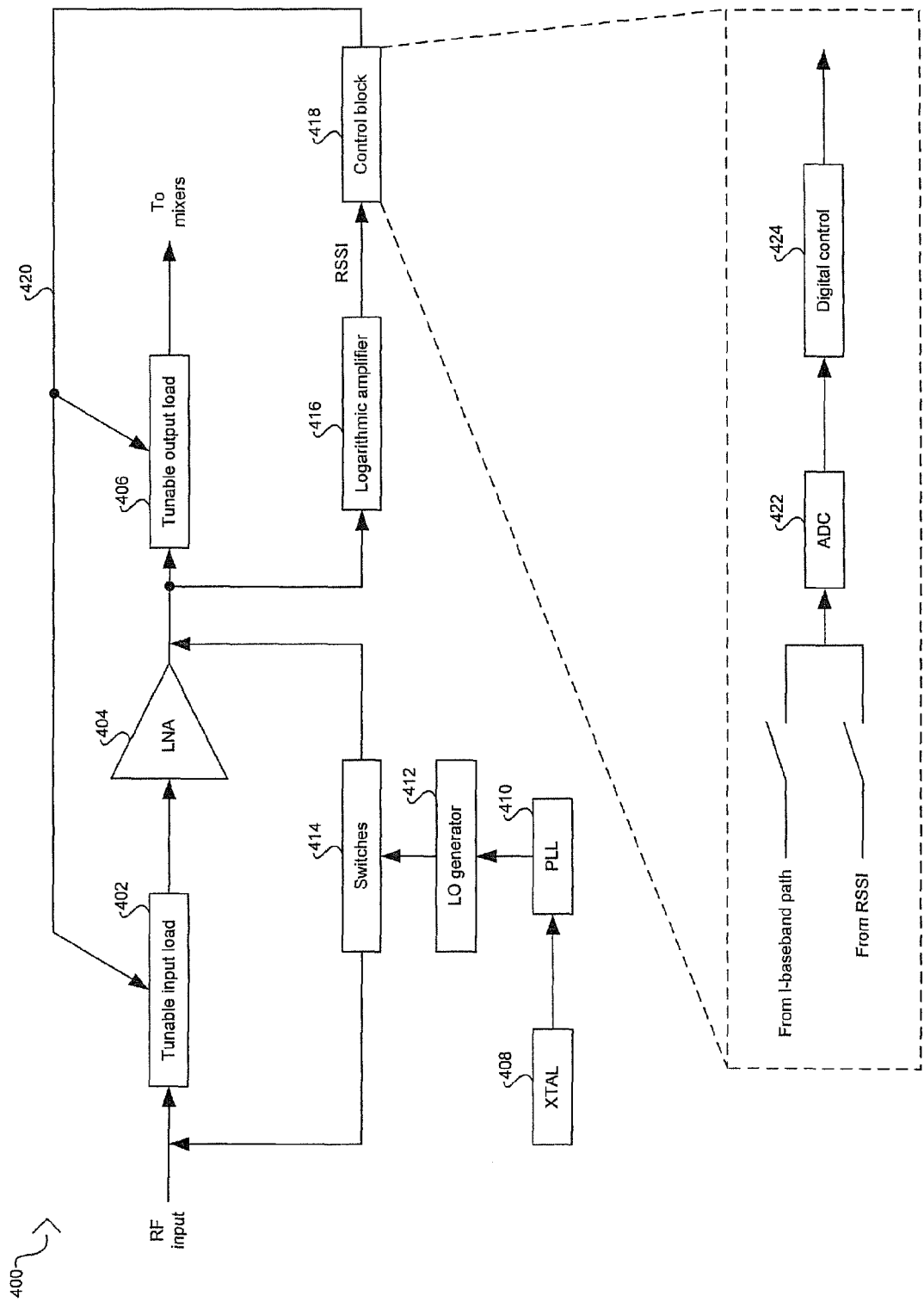
FIG. 4 is a block diagram illustrating an exemplary system for dynamically controlling the LNA gain, in accordance with an embodiment of the invention.

FIG. 4 is a block diagram illustrating an exemplary system for dynamically controlling the LNA gain, in accordance with an embodiment of the invention. Referring to FIG. 4, there is shown a dynamically controlled integrated LNA system 400 that may comprise a tunable input load 402, an LNA 404, a tunable output load 406, a crystal oscillator (XTAL) 408, a phase locked loop (PLL) 410, a local oscillator (LO) generator 412, switches 414, a logarithmic amplifier 416, and a control block 418.

The LNA 404 may correspond to an integrated LNA such as the variable gain LNAs 150a, 150b, and 150c described in FIGS. 1C-1D, for example. The logarithmic amplifier 416 may provide the same or substantially similar RSSI measuring operations as the logarithmic amplifier 172 described in FIGS. 1C-1D, for example. The XTAL 408 may be a reference crystal frequency such as the crystal 178 described in FIGS. 1C-1D, for example.

The PLL 410 may comprise suitable logic, circuitry, and/or code that may enable generating a reference signal that may be utilized by the LO generator 412. The operations provided by the PLL 410 may the same or substantially similar to those provided by the Σ-Δ fractional-N synthesizer 174 described in FIGS. 1C-1D, for example. In the present embodiment, by using a Σ-Δ fractional-N synthesizer, practically any frequency within the wanted range may be generated using a wide range of XTAL reference frequencies, which may allow optimization of the LNA tuning at arbitrary ranges within the wanted band of operation. The LO generator 412 may comprise suitable logic, circuitry, and/or code that may enable the generation of a single tone or single frequency signal that may be utilized to calibrate the gain provided by the tuning curve of the LNA 404. The operations provided by the LO generator 412 may be the same or substantially similar to those provided by the VCO block 176 and/or the LO signal dividers 156a and 156b described in FIGS. 1C-1D, for example.

The tunable input load 402 may comprise suitable logic, circuitry, and/or code that may enable dynamically controlling of a tuning curve associated with the LNA 404. In this regard, the tuning curve may be dynamically controlled by the digital control signal 420 generated by the control block 418. The tunable input load 402 may be implemented using a capacitor bank, for example.

The tunable output load 406 may comprise suitable logic, circuitry, and/or code that may enable dynamically controlling of the tuning curve associated with the LNA 404. In this regard, the tuning curve may be dynamically controlled by the digital control signal 420 generated by the control block 418. The tunable output load 406 may be implemented using a capacitor bank, for example.

The control block 418 may comprise suitable logic, circuitry, and/or code that may enable generation of the digital control signal 420 to adjust the tuning curve of the LNA 404 by adjusting the tunable input load 402 and/or the tunable output load 406. In an embodiment of the invention, if the control block 418 is integrated into the RF receiver, the control block 418 may correspond to the gain control block 188 described in FIG. 1D. In this regard, the signal AGC_RF 137b may correspond to the digital control signal 420, for example.

In another embodiment of the invention, the control block 418 may comprise an ADC 422 and a digital control 424. In this regard, the ADC 422 may be the same or substantially similar to the ADC 134 described in FIG. 1B and the digital control 424 may be implemented within the digital baseband processor 132 also as described in FIG. 1B. The ADC 422 may comprise suitable logic, circuitry, and/or code that may enable analog-to-digital conversion of either an RSSI measurement from the logarithmic amplifier 416 or a processed I component, such as signal 135a in FIGS. 1B-1D, for example. In another embodiment of the invention, the ADC 422 may enable analog-to-digital conversion of either an RSSI measurement from the logarithmic amplifier 416 or a processed Q component, such as signal 135c in FIGS. 1B-1D. The digital control 424 may comprise suitable logic, circuitry, and/or code that may enable generation of a digital control signal, such as the digital control signal 420, to adjust the tunable input load 402 and/or the tunable output load 404.

The switches 414 may comprise suitable logic, circuitry, and/or code that may enable selecting whether to introduce the single tone or single frequency signal generated by the LO generator 412 to the input of the tunable input load 402 and/or to the output of the LNA 404 to generate an RSSI measurement. The single tone or single frequency signal may be introduced during a calibration mode. For example, for each new selected desired channel of operation, the RF receiver may perform a calibration or tuning curve adjustment of the LNA 404 before normal gain operations. At least one signal may be utilized to select whether the single tone or single frequency signal is to be introduced to the input of the tunable input load 402, to the output of the LNA 404, or to both.

In operation, the dynamically controlled integrated LNA system 400 may be operated in a calibration mode to adjust the tuning curve of the LNA 404 for a currently selected desired channel of operation. The XTAL 408 may generate a reference signal that may be utilized by the PLL 410 to generate a signal that in turn may be utilized by the LO generator 412 to generate the single tone or single frequency signal that corresponds to the currently selected operating channel. The switches 414 may be utilized to introduce the single tone to the input of the tunable input load 402 and/or to the output of the LNA 404.

The output generated by the LNA 404 may be measured by the logarithmic amplifier 416 to generate an RSSI signal. The RSSI signal may be communicated to the control block 418 where the ADC 422 may digitize it. The digitized RSSI signal may be communicated to the digital control 424 where the digital control signal 420 may be generated to adjust the tunable input load 402 and/or the tunable output load 406 to achieve the appropriate tuning curve for the currently selected desired channel of operation. Once the tuning curve is properly adjusted, the dynamically controlled integrated LNA system 400 may operate in a normal mode of operation.

Figure 5:
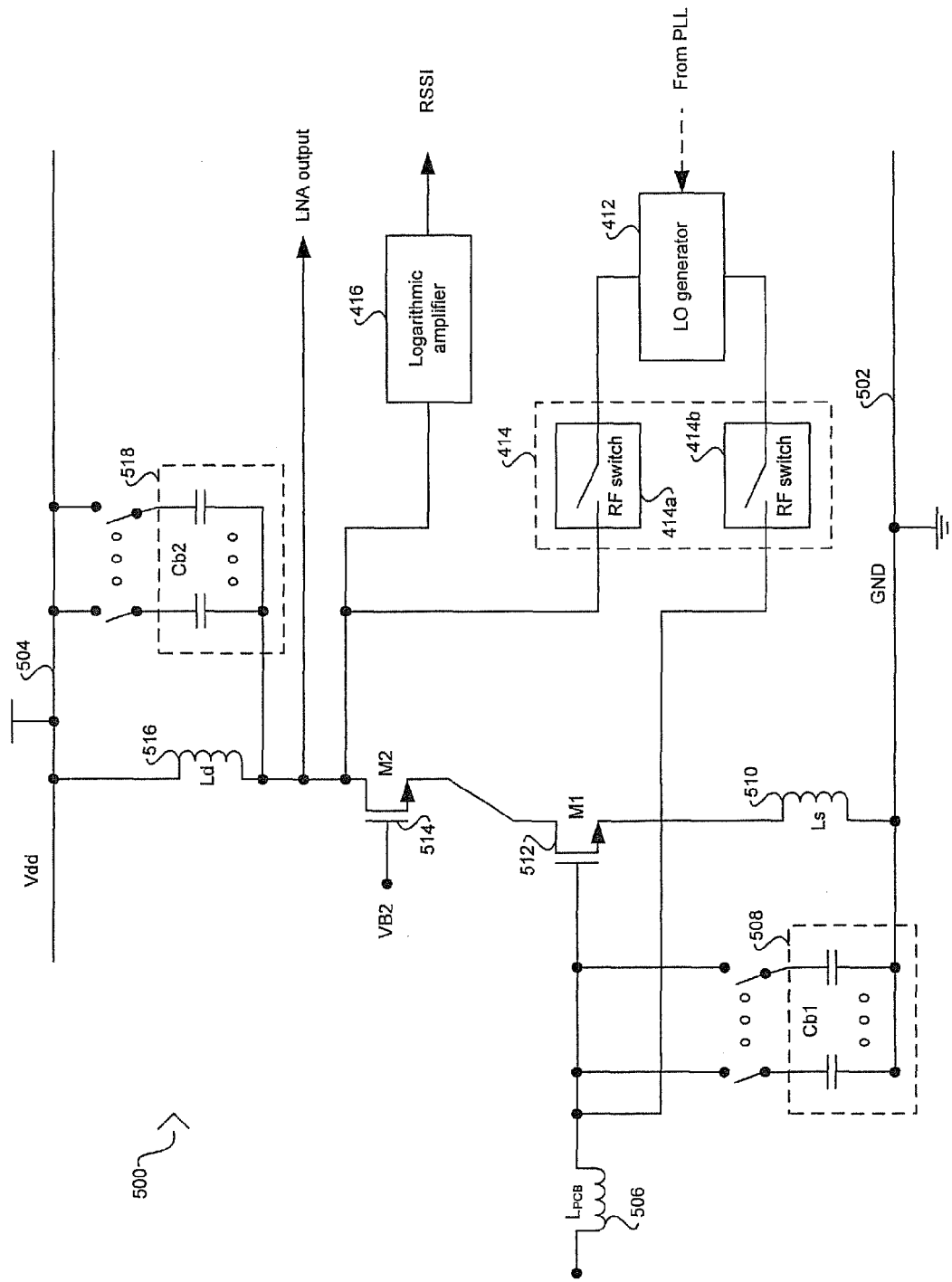
FIG. 5 is a schematic diagram illustrating an exemplary integrated LNA with tunable input load and tunable output load, in accordance with an embodiment of the invention.

FIG. 5 is a schematic diagram illustrating an exemplary integrated LNA with tunable input load and tunable output load, in accordance with an embodiment of the invention. Referring to FIG. 5, there is shown an integrated LNA 500 with a tunable input capacitor bank (Cb1) 508 and a tunable output capacitor bank (Cb2) 518. The integrated LNA 500 may comprise a first transistor (M1) 512, a second transistor (M2) 514, an inductor Ls 510, and an inductor Ld 516. The LNA 500 may also be implemented as a fully differential, that is, a balanced structure, and may communicate with PCB components, such as the baluns 146a, 146b, and 146c illustrated in FIGS. 1C-1D, via PCB traces that comprise series inductive components such as $L_{PCB}$ 506, for example. The U.S. application Ser. No. 11/385,423, filed on Mar. 21, 2006, discloses a method and system for mobile cellular television tuner utilizing current-steering variable gain at RF, and is hereby incorporated herein by reference in its entirety.

The tunable input capacitor bank (Cb1) 508 may comprise a plurality of capacitors wherein the appropriate capacitance value for the Cb1 508 may be selected by the digital control signal 420 described in FIG. 4 to adjust the tuning curve of the LNA 500 in accordance with a currently selected desired channel of operation. The Cb1 508 may be implemented in parallel to the Ls 510 with one end of the capacitors connected to the gate of M1 512 and the other end connected to GND 502. Similarly, the tunable output capacitor bank (Cb2) 518 may comprise a plurality of capacitors wherein the appropriate capacitance value selected for the Cb2 518 may be selected by the digital control signal 420 to adjust the tuning curve of the LNA 500 in accordance with a currently selected desired channel of operation. The Cb2 518 may be implemented in parallel to the Ld 516 with one end of the capacitors connected to the drain of M2 514 and the other end connected to Vdd 504.

Also shown in FIG. 5 are the logarithmic amplifier 416, the LO generator 412, and the switches 414 described in FIG. 4. The switches 414 may comprise a first RF switch 414a and a second RF switch 414b. The first RF switch 414a and the second RF switch 414b may comprise suitable logic, circuitry, and/or code that may enable selecting whether to introduce the single tone or single frequency for calibrating or adjusting the LNA 500 tuning curve at the gate of M1 512, at the drain of M2 514, or at both locations. In this regard, the first RF switch 414a enables introducing the single tone or single frequency signal at the drain of M2 514, while the second RF switch 414b enables introducing the single tone or single frequency signal at the gate of M1 512, for example. The output of the LNA 500, that is, the drain of M2 514, may be measured by the logarithmic amplifier 416 to generate an RSSI signal that may be utilized to adjust the Cb1 508 and/or the Cb2 518 to dynamically control the tuning curve of the LNA 500 to optimize the gain behavior of the LNA 500 for a currently selected desired operating channel.

Figure 6A:
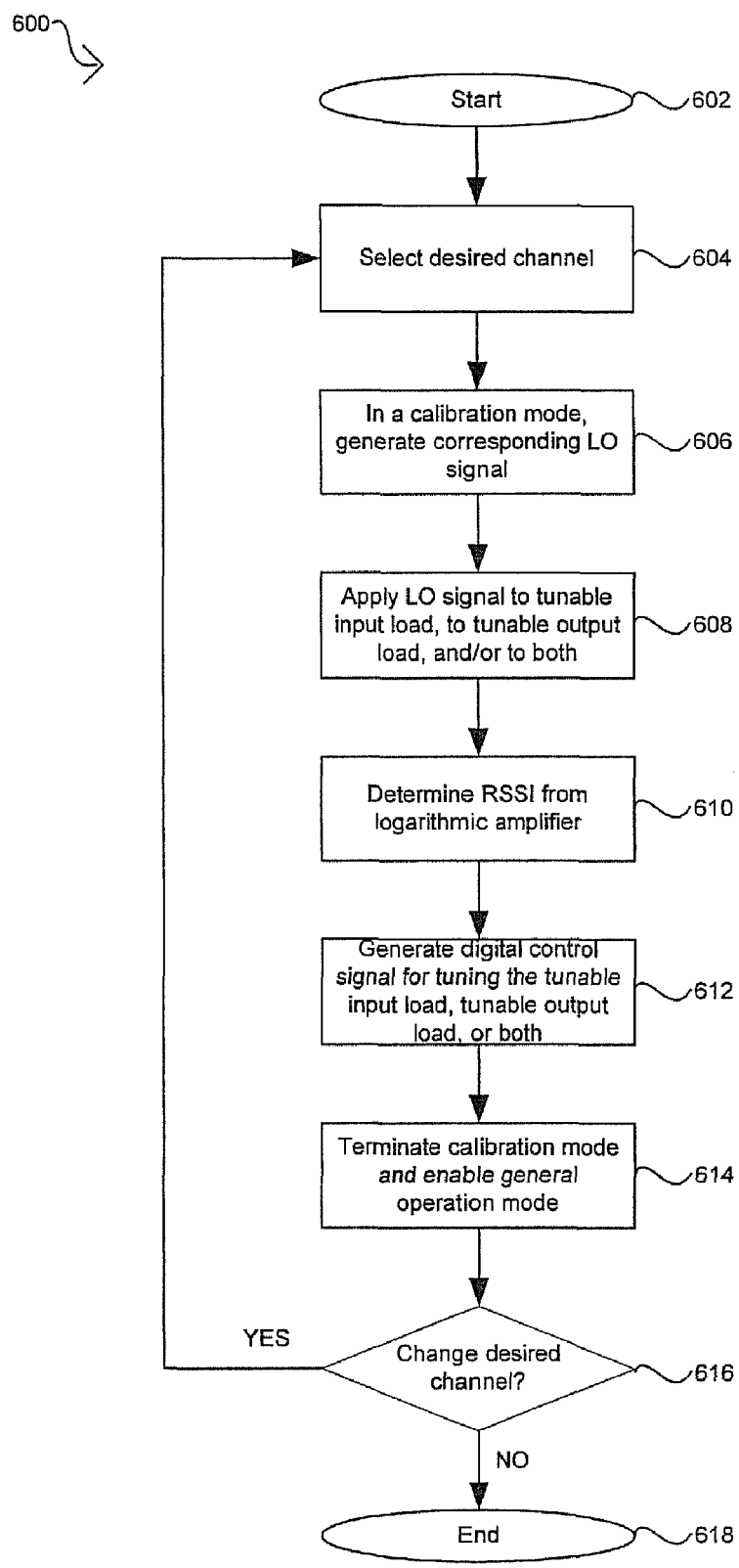
FIGS. 6A and 6B are flow diagrams illustrating exemplary steps in the calibration of a dynamically controlled variable gain LNA for a selected desired channel, in accordance with an embodiment of the invention.
Figure 6B:
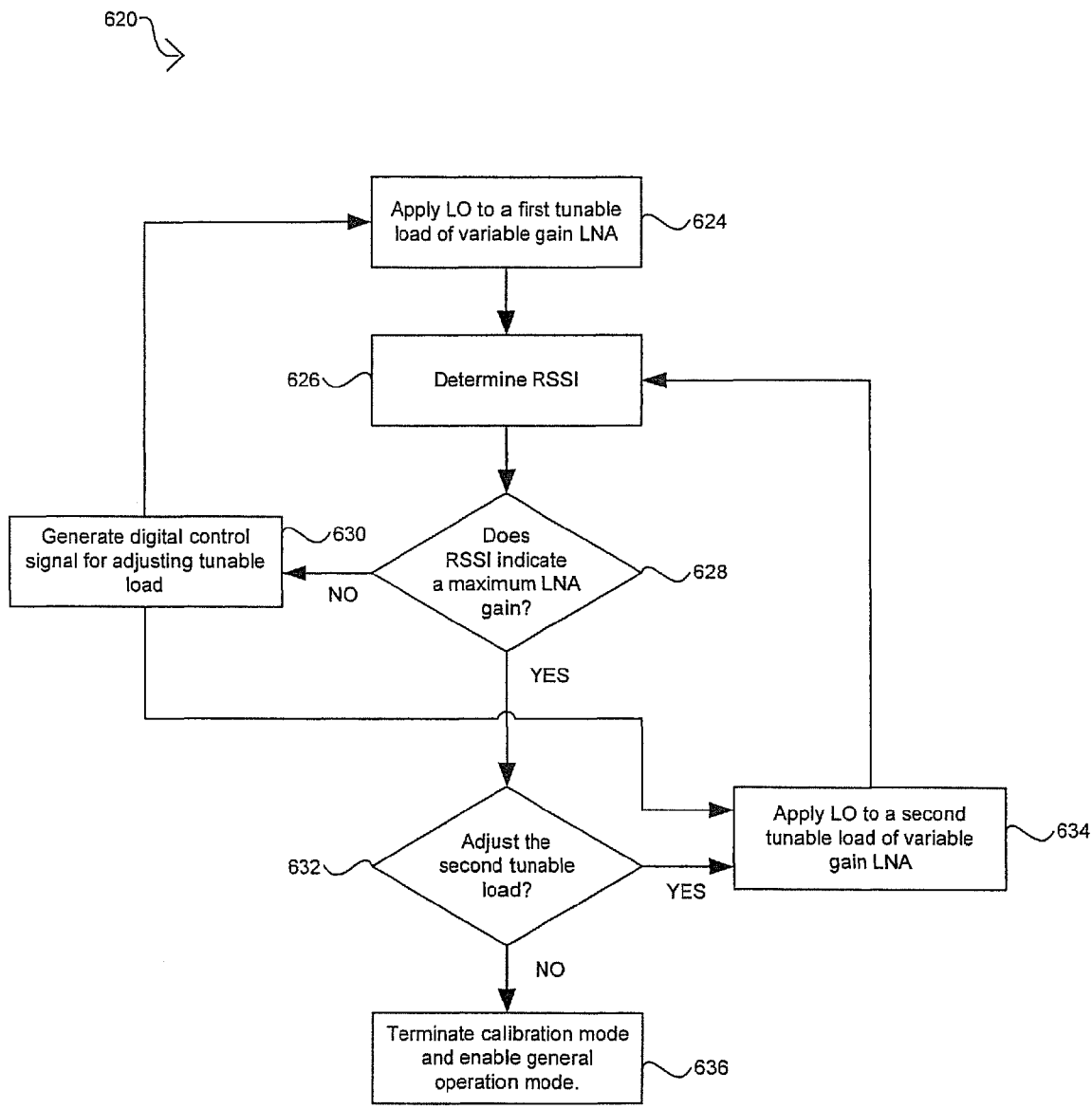

FIGS. 6A and 6B are flow diagrams illustrating exemplary steps in the calibration of a dynamically controlled variable gain LNA for a selected desired channel, in accordance with an embodiment of the invention. Referring to FIG. 6A, there is shown a flow chart 600. In step 604, a desired channel of operation is selected. In step 606, during the calibration mode, a single tone or single frequency signal that corresponds to the selected desired channel may be generated by the LO generator 412 to generate an output from the dynamically controlled variable gain LNA.

In step 608, the single tone or single frequency signal may be applied to the input of the tunable input load 402 or to the output of the dynamically controlled variable gain LNA. In the illustrative example in FIG. 5, the input of the tunable input load 402 corresponds to one end of the Cb1 508 while the output of the dynamically controlled variable gain LNA corresponds to one end of the Cb2 518. At least one signal may be generated to determine where to introduce the single tone or single frequency signal. In this regard, the switches 414 may be configured based on the signals generated.

In step 610, the output of the dynamically controlled variable gain LNA may be measured by the logarithmic amplifier 416 to determine an RSSI value. In step 612, the control block 418 may generate the digital control signal 420 to adjust the tunable input load 402 or the tunable output load 406. In step 614, the calibration operation may be completed and the single-chip multi-band RF receiver 140a may enable a general or normal gain mode of operation for the dynamically controlled variable gain LNA. In step 616, the single-chip multi-band RF receiver 140a may determine whether to select a new desired operating channel. When the new desired channel is selected, the process may proceed to step 604. In instances where the new desired channel is not selected, the process may proceed to end step 618.

In another embodiment of the invention, the calibration operation may require a new reading of the dynamically controlled variable gain LNA output to generate an updated RSSI value for each adjustment made to the tunable input load 402 and/or the tunable output load 406. In this regard, the steps 610 and 612 may be repeated iteratively multiple times until the tuning curve of the dynamically controlled variable gain LNA achieves a determined performance for the selected desired channel of operation. This may be achieved when the RSSI reading indicates that the gain is maximized for the available tuning range for the specific LO input injected at the input or output load. When the tuning curve achieves the determined performance, the process may again proceed to step 614 where the single-chip multi-band RF receiver 140a may terminate the calibration operation and may proceed to enable a general or normal gain mode of operation.

Referring to FIG. 6B, there is shown a flow diagram 620. In step 624, the single tone or single frequency signal generated by the LO generator 412 that corresponds to the selected desired channel may be applied to a first tunable load communicatively coupled to the dynamically controlled variable gain LNA. The first tunable load may be the input or the output load. In step 626, the output of the dynamically controlled variable gain LNA may be measured by the logarithmic amplifier 416 to determine an RSSI value. In step 628, the control block 418 may determine whether the RSSI measurement indicates that a maximum gain is achieved by the dynamically controlled variable gain LNA. When a maximum gain is not achieved, the process may proceed to step 630. In step 630, the control block 418 may generate a digital control signal to adjust the first tunable load.

Returning to step 628, when the RSSI measurement indicates that a maximum gain is achieved, the process may proceed to step 632. In step 632, the calibration process may require that a second tunable load communicatively coupled to the dynamically controlled variable gain LNA also be calibrated. The second tunable load may be the input or output load not yet calibrated. When a second tunable is to be calibrated, the process may proceed to step 634. In step 634, the single tone or single frequency signal generated by the LO generator 412 that corresponds to the selected desired channel may be applied to the second tunable load of the dynamically controlled variable gain LNA. After step 634, the process may proceed to steps 626 and 628. When a maximum gain is not achieved in step 628, the process may proceed to step 630 where the control block 418 may generate a digital control signal to adjust the second tunable load.

Returning to step 632, when the calibration process does not require that a second tunable load communicatively coupled to the dynamically controlled variable gain LNA be calibrated or when calibration of the second tunable load has been completed, the process may proceed to step 636. In step 636, the single-chip multi-band RF receiver 140a may terminate the calibration operation and may proceed to enable a general or normal gain mode of operation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
generating an oscillating signal via an on-chip frequency synthesizer in a multi-band wireless receiver chip; and
dynamically modifying a gain in a low-noise amplifier (LNA) within said multiband wireless receiver chip for a receiver channel, by applying a control signal to at least one tunable load communicatively coupled to said LNA, wherein said control signal is generated by applying said generated oscillating signal to said at least one tunable load communicatively coupled to said LNA.

2. The method according to claim 1, comprising applying said generated oscillating signal to a tunable input load communicatively coupled to said LNA.

3. The method according to claim 1, comprising applying said generated oscillating signal to a tunable output load communicatively coupled to said LNA.

4. The method according to claim 1, comprising sequentially applying said generated oscillating signal to a tunable output load and to a tunable input load communicatively coupled to said LNA.

5. The method according to claim 1, comprising generating a received signal strength indicator (RSSI) signal from an output of said LNA generated after said application of said control signal to said at least one tunable load communicatively coupled to said LNA.

6. The method according to claim 5, comprising generating said control signal for controlling said at least one tunable load communicatively coupled to said LNA based on said generated RSSI signal.

7. The method according to claim 1, wherein said at least one tunable load communicatively coupled to said LNA is a capacitor bank.

8. A non-transitory computer readable medium having stored thereon, a computer program having at least one code section, the at least one code section being executable by a computer for causing the computer to perform steps comprising:
generating an oscillating signal via an on-chip frequency synthesizer in a multi-band wireless receiver chip; and
dynamically modifying a gain in a low-noise amplifier (LNA) within said multiband wireless receiver chip for a receiver channel, by applying a control signal to at least one tunable load communicatively coupled to said LNA, wherein said control signal is generated by applying said generated oscillating signal to said at least one tunable load communicatively coupled to said LNA.

9. The non-transitory computer readable medium according to claim 8, wherein said at least one code section comprises code for applying said generated oscillating signal to a tunable input load communicatively coupled to said LNA.

10. The non-transitory computer readable medium according to claim 8, wherein said at least one code section comprises code for applying said generated oscillating signal to a tunable output load communicatively coupled to said LNA.

11. The non-transitory computer readable medium according to claim 8, wherein said at least one code section comprises code for sequentially applying said generated oscillating signal to a tunable output load and to a tunable input load communicatively coupled to said LNA.

12. The non-transitory computer readable medium according to claim 8, wherein said at least one code section comprises code for generating a received signal strength indicator (RSSI) signal from an output of said LNA generated after said application of said control signal to said at least one tunable load communicatively coupled to said LNA.

13. The non-transitory computer readable medium according to claim 12, wherein said at least one code section comprises code for generating said control signal for controlling said at least one tunable load communicatively coupled to said LNA based on said generated RSSI signal.

14. The non-transitory computer readable medium according to claim 8, wherein said at least one tunable load communicatively coupled to said LNA is a capacitor bank.

15. A system, the system comprising:
a multi-band wireless receiver chip comprising an on-chip frequency synthesizer; said frequency synthesizer is operable to generate an oscillating signal; and
said multi-band wireless receiver chip is operable to dynamically modify a gain in a low-noise amplifier (LNA) within said multi-band wireless receiver chip for a receiver channel, by applying a control signal to at least one tunable load communicatively coupled to said LNA, wherein said control signal is generated by applying said generated oscillating signal to said at least one tunable load communicatively coupled to said LNA.

16. The system according to claim 15, comprising one or more circuits that are operable to apply said generated oscillating signal to a tunable input load communicatively coupled to said LNA.

17. The system according to claim 15, comprising one or more circuits that are operable to apply said generated oscillating signal to a tunable output load communicatively coupled to said LNA.

18. The system according to claim 15, comprising one or more circuits that are operable to sequentially apply said generated oscillating signal to a tunable output load and to a tunable input load communicatively coupled to said LNA.

19. The system according to claim 15, comprising one or more circuits that are operable to generate a received signal strength indicator (RSSI) signal from an output of said LNA generated after said application of said control signal to said at least one tunable load communicatively coupled to said LNA.

20. The system according to claim 19, wherein said one or more circuits within said multi-band wireless receiver chip are operable to generate said control signal for controlling said at least one tunable load communicatively coupled to said LNA based on said generated RSSI signal.

21. The system according to claim 19, wherein said one or more circuits external to said multi-band wireless receiver chip are operable to generate said control signal for controlling said at least one tunable load communicatively coupled to said LNA based on said generated RSSI signal.

22. The system according to claim 15, wherein said at least one tunable load communicatively coupled to said LNA is a capacitor bank.

* * * * *